Dec. 27, 1949  G. E. DATH  2,492,525
FRICTION SHOCK ABSORBING MECHANISM
FOR RAILWAY DRAFT RIGGINGS
Filed Sept. 8, 1944
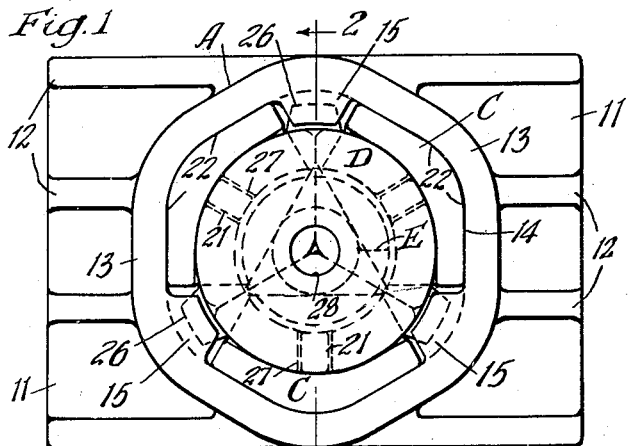
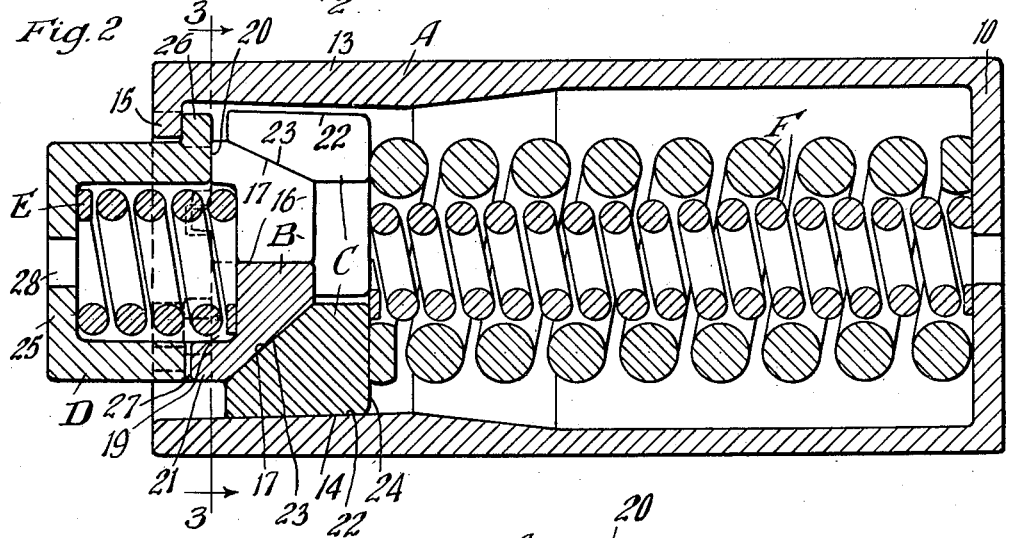
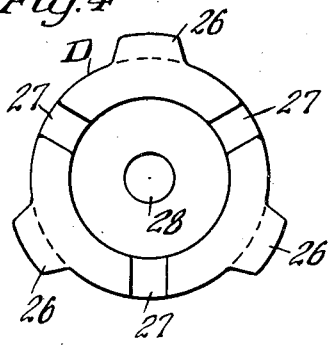
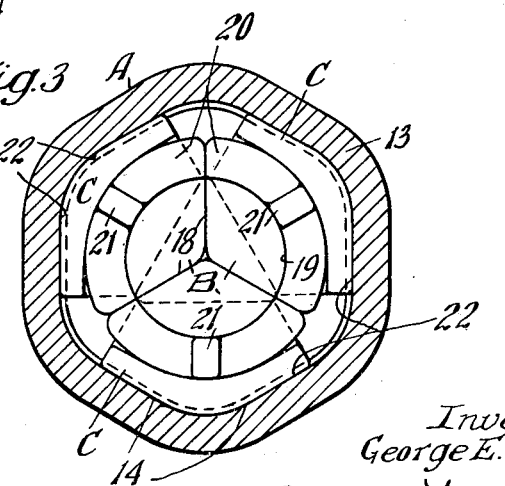
Inventor
George E. Dath
By Henry Fuchs
Atty.

Patented Dec. 27, 1949

2,492,525

UNITED STATES PATENT OFFICE 2,492,525

FRICTION SHOCK ABSORBING MECHANISM FOR RAILWAY DRAFT RIGGINGS

George E. Dath, Mokena, Ill., assignor to W. H. Miner, Inc., Chicago, Ill., a corporation of Delaware Application September 8, 1944, Serial No. 553,184

4 Claims. (Cl. 213—34)

1

This invention relates to improvements in friction shock absorbing mechanisms, especially adapted for railway draft riggings.

One object of the invention is to provide a friction shock absorbing mechanism comprising a friction casing and a spring resisted friction clutch slidable within the casing, including a wedge block and friction shoes with which the block has wedging engagement, wherein the wedge block is composed of sections which are automatically adjustable with respect to each other and the shoes to compensate for irregularities in the parts of the mechanism which are unavoidable in manufacture.

A further object of the invention is to provide in a mechanism, as set forth in the preceding paragraph, a sectional wedge member, the sections of which are relatively adjustable and are held against the shoes by spring means, whereby a certain amount of flexibility of the wedge is provided to compensate for the slight irregularities in the parts of the mechanism which are unavoidable in manufacture.

A more specific object of the invention is to provide a friction shock absorbing mechanism, comprising a friction casing; a friction clutch including a sectional wedge and friction shoes, slidable within the casing; and a spring resistance within the casing yieldingly opposing inward movement of the shoes, wherein the wedge is composed of a plurality of relatively adjustable sections and is actuated through a pressure transmitting member adapted to receive the actuating force, and wherein a spring under high compression, reacting between the pressure transmitting member and sections of the wedge, transmits pressure from the pressure transmitting member to the sections of the wedge to flexibly support the sections of the wedge and force the same against the shoes, thus compensating for slight irregularities in the parts of the mechanism.

Other objects of the invention will more clearly appear from the description and claims hereinafter following.

In the drawing forming a part of this specification, Figure 1 is a front elevational view of my improved friction shock absorbing mechanism. Figure 2 is a vertical longitudinal sectional view, corresponding substantially to the line 2—2 of Figure 1. Figure 3 is a transverse vertical sectional view, corresponding substantially to the line 3—3 of Figure 2. Figure 4 is a rear elevational view of the pressure transmitting cap of my improved mechanism.

2

As shown in the drawing, my improved friction shock absorbing mechanism comprises broadly a friction casing A; a sectional wedge B; three friction shoes C—C—C; a pressure transmitting cap D; a pressure transmitting spring E; and a main spring resistance F.

The casing A is of substantially hexagonal cross section, open at its front end and closed at its rear end by a transverse vertical end wall 10. The wall 10 is extended laterally outwardly at opposite sides of the casing, thereby providing flanges 11—11 which cooperate with the rear stop lugs of the car underframe in the manner of the usual rear follower. The flanges 11—11 are suitably reinforced by webs 12—12 formed integral with the walls of the casing A and said flanges. At the open front end of the casing, the side walls are thickened, as indicated at 13. This thickened portion of the casing forms the friction shell section proper thereof. The friction shell section of the casing is provided with three interior friction surfaces 14—14—14 of V-shaped, transverse cross section, arranged symmetrically about the longitudinal central axis of the casing, each V-shaped surface being composed of two flat faces. The V-shaped friction surfaces 14—14—14 converge inwardly of the casing, thus providing a tapered friction shell section. At the open front end thereof, the casing A is provided with three laterally inwardly projecting, circumferentially spaced, retaining lugs 15—15—15. The lugs 15—15—15 are alternated with the friction surfaces 14—14—14, that is, they are located at the corners of the casing between adjacent friction surfaces.

The wedge B is in the form of a sectional block, comprising three similar sections 16—16—16, arranged symmetrically about the longitudinal central axis of the mechanism. Each wedge section 16 has a flat outer wedge face 17. The wedge faces 17—17—17 of the three sections converge inwardly of the mechanism. On the inner side, each block has two flat faces 18—18 disposed at an angle of 120 degrees to each other and extending lengthwise of the mechanism. The faces 18—18 of each section 16 bear on the corresponding opposed faces 18—18 of the remaining two sections of the wedge. The front end portion of each section is recessed, as indicated at 19, thereby providing a central spring seat in the assembled condition of the wedge. The front end of each section 16 of the wedge presents a flat face 20 which is located laterally outwardly of the recess 19 thereof. As will be seen upon reference to Figure 3, the flat end faces 20—20—20 of the three sections of the wedge, in the assembled condition of the latter, form, in effect, a continuous circumferential surface surrounding the spring seat formed by the recesses 19—19—19. At the mid portion of the surface 20 of each section 16 is provided a forwardly projecting lug or rib 21, which is radial to the central longitudinal axis of the mechanism. As hereinafter described, the lugs or ribs 21—21—21 of the three sections of the wedge serve as locking means for preventing relative rotation of the wedge B and the pressure transmitting cap D.

The friction shoes C are three in number and surround the sectional wedge B. Each shoe C has a friction surface 22 on the outer side thereof of V-shaped, transverse cross section engaging one of the V-shaped friction surfaces 14 of the casing A. On the inner side, each shoe has a flat wedge face 23, correspondingly inclined to and engaging with one of the faces 17 of the sectional wedge. The arrangement is such that the three shoes C—C—C respectively engage the three sections 16—16—16 of the wedge B, that is, the wedge face of each shoe engages the wedge face of the section 16 at the corresponding side of the mechanism. At the inner end, each shoe presents a flat, transverse face 24 forming an abutment for the main spring resistance F.

The pressure transmitting spring cap D is in the form of a cup having a transverse outer end wall 25 adapted to bear on the usual front follower of the draft rigging of a railway car. At the inner end, the cap D is provided with three outwardly projecting, radial lugs 26—26—26 extending from the side wall thereof and engaging in back of the retaining lugs 15—15—15 of the casing to limit outward movement of the cap and hold the same assembled with the casing. To maintain the lugs of the cap D aligned with the retaining lugs of the casing, the cap is locked to the wedge B by means of the lugs 21—21—21 of the sections of the wedge, the cap being provided with three radially disposed seats 27—27—27 at the inner end thereof in which the lugs 21—21—21 of the wedge B are seated.

As will be evident, the friction shoes C—C—C are held against rotation with respect to the casing by the interengaging V-shaped friction surfaces of the casing and shoes, and the wedge block is locked against rotation with respect to the casing by the flat engaging wedge faces of the shoes. Inasmuch as the cap D is locked to the wedge B by the lugs 21 being seated in the seats 27 of the cap, the latter is effectively locked against rotation with respect to the casing by the interlocked engagement between the wedge, shoes, and casing.

The pressure transmitting spring E comprises a short helical coil disposed within the cap D and bearing at its front and rear ends, respectively, on the end wall 25 of the cap and the bottom of the seat formed by the recesses 19—19—19 of the wedge sections 16—16—16. The spring is under considerable initial compression and tends to force the sections 16—16—16 of the wedge rearwardly against the shoes.

The main spring resistance F is disposed within the casing A and comprises a light inner coil and a heavier outer coil. The inner and outer coils of the spring resistance F bear at the front and rear ends, respectively, on the inner ends of the shoes C—C—C and the rear wall 10 of the casing.

In assembling the mechanism, all of the parts are inserted through the open front end of the casing, the pressure transmitting cap D, with the spring E assembled therewith, being applied after the other parts. In applying the cap D to the casing A, the previously assembled parts of the mechanism are first partly compressed, that is, the wedge B is forced inwardly against the shoes and spring F by a suitable tool to an extent to provide sufficient clearance to permit the lugs 26 of the cap to be engaged in back of the lugs 15 of the casing, the cap D being provided with an opening 28 extending centrally through the wall 25 thereof, to accommodate the tool, which is preferably in the form of a bar of circular cross section. The cap being turned to a position wherein the lugs 26—26—26 thereof pass between the lugs 15—15—15 of the casing is then pushed into the open end of the casing to an extent to dispose the lugs thereof to the rear of the lugs 15—15—15. The cap is then turned about its axis to align the lugs 26 with the lugs 15. This adjustment of the cap also brings the seats 27 of the cap into alignment with the lugs 21 of the sectional wedge B. The pressure is then removed by withdrawing the holding tool, thereby permitting the mechanism to expand, seating the lugs 21 in the seats 27, locking the cap against rotation and seating the lugs 26 of the cap against the lugs 15 of the casing.

In the assembled condition of the mechanism, the spring E within the cap D being under predetermined compression tends to force the sections of the wedge rearwardly away from the cap and also yieldingly opposes rocking movement of the wedge sections. A certain amount of flexibility of the wedge is thus provided by its sectional formation in conjunction with the resiliency of the pressure transmitting spring E to compensate for slight irregularities in the parts of the mechanism, the wedge sections, although they normally bear on the pressure transmitting cap D, being tiltable or rockable against the action of the spring E to permit automatic adjustment of the several sections of the wedge to take care of variations in inclinations of the cooperating wedge faces of the wedge and shoes and of the cooperating friction surfaces of the shoes and casing, and also being severally projectible rearwardly from the cap by the action of the spring E to eliminate any slack which might otherwise occur between the wedge, shoes, and main spring resistance and assure proper seating of the wedge faces of the wedge on the wedge faces of the shoes.

The operation of my improved friction shock absorbing mechanism is as follows: Upon compression of the mechanism by inward movement of the front follower of the draft rigging or forward movement of the casing A toward the front follower, the pressure transmitting cap D is forced inwardly of the casing carrying the sectional wedge B inwardly therewith. During this action the shoes are forced inwardly against the resistance of the spring F by the wedge and wedged apart into tight frictional engagement with the friction surfaces of the casing. High frictional resistance is thus provided during the compression of the mechanism. When the actuating force is removed, the expansive action of the spring forces the shoes outwardly, carrying the wedge B and pressure transmitting cap D therewith until outward movement of the cap is arrested by engagement of the lugs thereof with the stop lugs 15 of the casing, thereby limiting outward movement of the wedge and shoes.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing having interior, lengthwise extending friction surfaces; of a plurality of friction shoes having friction surfaces slidingly engaged with said casing surfaces for lengthwise movement, said surfaces of the shoes and casing being interengaged to prevent relative rotation of the shoes and casing; a sectional wedge block, said block comprising a plurality of sections arranged symmetrically about the longitudinal central axis of the mechanism, said sections corresponding in number to the shoes, and said sections and shoes having engaging flat wedge faces holding said sections and shoes against relative rotation around the central longitudinal axis of the mechanism; a spring cap bearing on the outer ends of said wedge sections; stop lugs on said casing and cap for limiting outward movement of the cap; a spring under compression within said cap and bearing on the outer ends of said wedge sections; cooperating interengaging locking means on said cap and wedge sections for holding said cap against rotation with respect to the wedge block; and a main spring resistance within the casing yieldingly resisting inward movement of the shoes.

2. In a friction shock absorbing mechanism, the combination with a friction casing; of a plurality of friction shoes, said shoes and casing having interengaging friction surfaces of guide and groove formation extending lengthwise of the casing and limiting said shoes to movement lengthwise of said casing; a sectional wedge block between said shoes comprising a plurality of sections arranged symmetrically about the longitudinal central axis of the mechanism, said sections corresponding in number to said shoes, said sections and shoes having cooperating flat wedge faces; a hollow cap closed at its front end by a wall and open at its rear end, the rear end of said cap bearing on the front ends of the wedge sections; a spring within said cap bearing at its front end on the end wall of said cap and at its rear end on the outer ends of said wedge sections; interengaging stop lugs on said cap and casing for restricting outward movement of the cap; means locking said cap against rotation with respect to the sectional wedge, comprising interengaging lugs and seats on said wedge sections and cap; and spring means within the casing yieldingly resisting inward movement of the shoes.

3. In a friction shock absorbing mechanism, the combination with a friction casing having interior, lengthwise extending, V-shaped friction surfaces; of a plurality of friction shoes having V-shaped friction surfaces slidingly engaged with said casing surfaces for lengthwise movement, said surfaces of the shoes and casing being interengaged to prevent relative rotation of the shoes and casing; a sectional wedge block, said block comprising a plurality of sections arranged symmetrically about the longitudinal central axis of the mechanism, said sections corresponding in number to the shoes, and said sections and shoes having engaging flat wedge faces holding said sections and shoes against relative rotation around the central longitudinal axis of the mechanism; a spring cap bearing on the outer ends of said wedge sections; stop lugs on said casing and cap for limiting outward movement of the cap; a spring under compression within said cap and bearing on the outer ends of said wedge sections; cooperating, interengaging locking means on said cap and wedge sections for holding said cap against rotation with respect to the wedge block; and a main spring resistance within the casing yieldingly resisting inward movement of the shoes.

4. In a friction shock absorbing mechanism, the combination with a friction casing; of a plurality of friction shoes, said shoes and casing having interengaging friction surfaces, of V-shaped, transverse cross section extending lengthwise of the casing and limiting said shoes to movement lengthwise of said casing; a sectional wedge block between said shoes comprising a plurality of sections arranged symmetrically about the longitudinal central axis of the mechanism, said sections corresponding in number to said shoes, said sections and shoes having cooperating flat wedge faces; a hollow cap closed at its front end by a wall and open at its rear end, the rear end of said cap bearing on the front ends of the wedge sections; a spring under predetermined initial compression, within said cap bearing at its front end on the end wall of said cap and at its rear end on the outer ends of said wedge sections; interengaging stop lugs on said cap and casing for restricting outward movement of the cap; means locking said cap against rotation with respect to the sectional wedge, comprising interengaging lugs and seats on said wedge sections and cap; and spring means within the casing yieldingly resisting inward movement of the shoes.

GEORGE E. DATH.

REFERENCES CITED

The following references are of record in the file of this patent:

UNITED STATES PATENTS

| Number | Name | Date |
|---|---|---|
| 909,446 | O'Connor | Jan. 12, 1909 |
| 1,288,970 | O'Connor | Dec. 24, 1918 |
| 1,530,736 | O'Connor | Mar. 24, 1925 |
| 1,542,828 | O'Connor | June 23, 1925 |
| 1,620,681 | O'Connor | Mar. 15, 1927 |
| 1,695,500 | O'Connor | Dec. 18, 1928 |
| 2,307,236 | Pierce | Jan. 5, 1943 |
| 2,354,826 | Olander | Aug. 1, 1944 |